US012670537B1

(12) United States Patent
Sengupta et al.

(10) Patent No.: US 12,670,537 B1
(45) Date of Patent: Jun. 30, 2026

(54) COLLABORATIVE WATERMARKING OF GENERATED CONTENT

(71) Applicant: Amazon Technologies, Inc., Seattle, WA (US)

(72) Inventors: Sailik Sengupta, Santa Clara, CA (US); Georgiana Dinu, New York, NY (US); Dan Roth, Philadelphia, PA (US)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 18/539,058

(22) Filed: Dec. 13, 2023

(51) Int. Cl.
*G06T 1/00* (2006.01)
*G06F 40/284* (2020.01)
*G06F 40/40* (2020.01)

(52) U.S. Cl.
CPC .......... *G06T 1/0021* (2013.01); *G06F 40/284* (2020.01); *G06F 40/40* (2020.01); *G06T 2201/005* (2013.01)

(58) Field of Classification Search
CPC ............. G06T 1/0021; G06T 2201/005; G06T 1/0028; G06T 1/00071; G06T 1/0085; G06T 2201/0081; G06T 2201/0202; G06T 3/4046; G06T 5/60; G06T 9/002; G06T 2207/20076; G06T 2207/20081; G06T 2207/20084; G06F 40/284; G06F 40/40; G06F 40/237; G06F 40/216; G06F 40/30; G06F 16/3344; G06F 40/211; G06F 21/16; G06F 21/1063; G06F 40/279; G06F 21/106; G06F 18/214; G06F 18/22; G06F 18/241; G06F 18/24; G06F 18/2411; G06F 18/2415; G06F 30/27; G06V 20/70; G06V 30/413; G06V 10/454; G06V 10/54; (Continued)

(56) References Cited

U.S. PATENT DOCUMENTS

2017/0017779 A1* 1/2017 Huang .................... G06F 21/16
2021/0120307 A1* 4/2021 Bastable ............. H04N 21/4408
(Continued)

FOREIGN PATENT DOCUMENTS

CN 104168320 A * 11/2014
CN 117494081 A * 2/2024 ............. G06F 21/16
(Continued)

OTHER PUBLICATIONS

Kirchenbauer et al., "A Watermark for Large Language Models", arXiv, Jun. 2023, pp. 1-13.

*Primary Examiner* — Jose L Couso
(74) *Attorney, Agent, or Firm* — KNOBBE, MARTENS, OLSON & BEAR, LLP

(57) ABSTRACT
A system may receive a content request, and generate a set of tokens based on the content request. The system may transmit the set of tokens to a model deployer, and receive a mask in response. The system may then generate a second mask. The system may combine the model deployer mask and the second mask to generate a combined mask. The system may obtain a next token as part of a response, the next token selected based in part on an output of a machine learning model in response to the set of tokens and the combined mask being provided as input to the machine learning model. The system may add the next token to the set of tokens to generate an updated set of tokens; and transmit the updated set of tokens to satisfy the content request.

20 Claims, 5 Drawing Sheets

(58) Field of Classification Search
CPC .. G06V 10/7764; G06V 10/774; G06V 10/82;
G06V 10/84; G06V 20/41; G06V
30/18057; G06V 20/698; G06V
30/19173; G06V 30/194; H04N 21/8352;
H04N 21/8358; H04L 9/3242; H04L
9/3247; H04L 9/0643; G06N 3/02; G06N
3/08–088; G06N 3/0445; G06N 3/0454;
G06N 3/0464; G06N 3/4046; G06N
3/4053; G06N 7/00; G06N 7/01; G06N
20/00; G06K 7/1482; Y10S 128/925
See application file for complete search history.

(56) References Cited

U.S. PATENT DOCUMENTS

| | | | | |
|---|---|---|---|---|
| 2022/0394102 A1* | 12/2022 | Wang | .................... | G06F 21/60 |
| 2023/0274183 A1* | 8/2023 | Mauser | ................ | H04W 12/02 |
| | | | | 706/12 |

FOREIGN PATENT DOCUMENTS

| | | | | | |
|---|---|---|---|---|---|
| JP | 4053701 | B2 | * | 2/2008 | ............ G06F 21/10 |
| KR | 20220101671 | A | * | 7/2022 | ............... G06N 3/09 |
| KR | 20220145380 | A | * | 10/2022 | ......... G06F 21/6245 |
| KR | 20230020262 | A | * | 2/2023 | ........... H04L 9/3213 |

* cited by examiner

300

START WATERMARKED CONTENT GENERATION ROUTINE — 302

TRANSMIT PROMPT TO MODEL CREATOR — 304

RECEIVE TOKEN(S) FROM MODEL CREATOR — 306

308

IS RESPONSE TO CONTENT REQUEST COMPLETE?

YES

NO

310

GENERATE MASK FOR NEXT TOKEN BASED ON RECEIVED TOKEN(S)

TRANSMIT MASK TO MODEL CREATOR — 312

TRANSMIT WATERMARKED RESPONSE — 314

END ROUTINE — 316

COLLABORATIVE WATERMARKING OF GENERATED CONTENT

BACKGROUND

Generative computing systems typically involve a number of different actors. First, model creators create generative models. Second, there may be model modifiers who modify the models created by the model creators or the models modified by one or more model modifiers. Third, there may be model deployers who host and provide access to the models via a computing system. Lastly, there are model users that use the models. In some examples, one or more of these actors may be the same entity. In some examples, the model user is unaware of any of the other actors. The number of actors that have access to the models prior to the user using the model can make it challenging to determine which actor contributed to a model that the model user accesses and uses.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
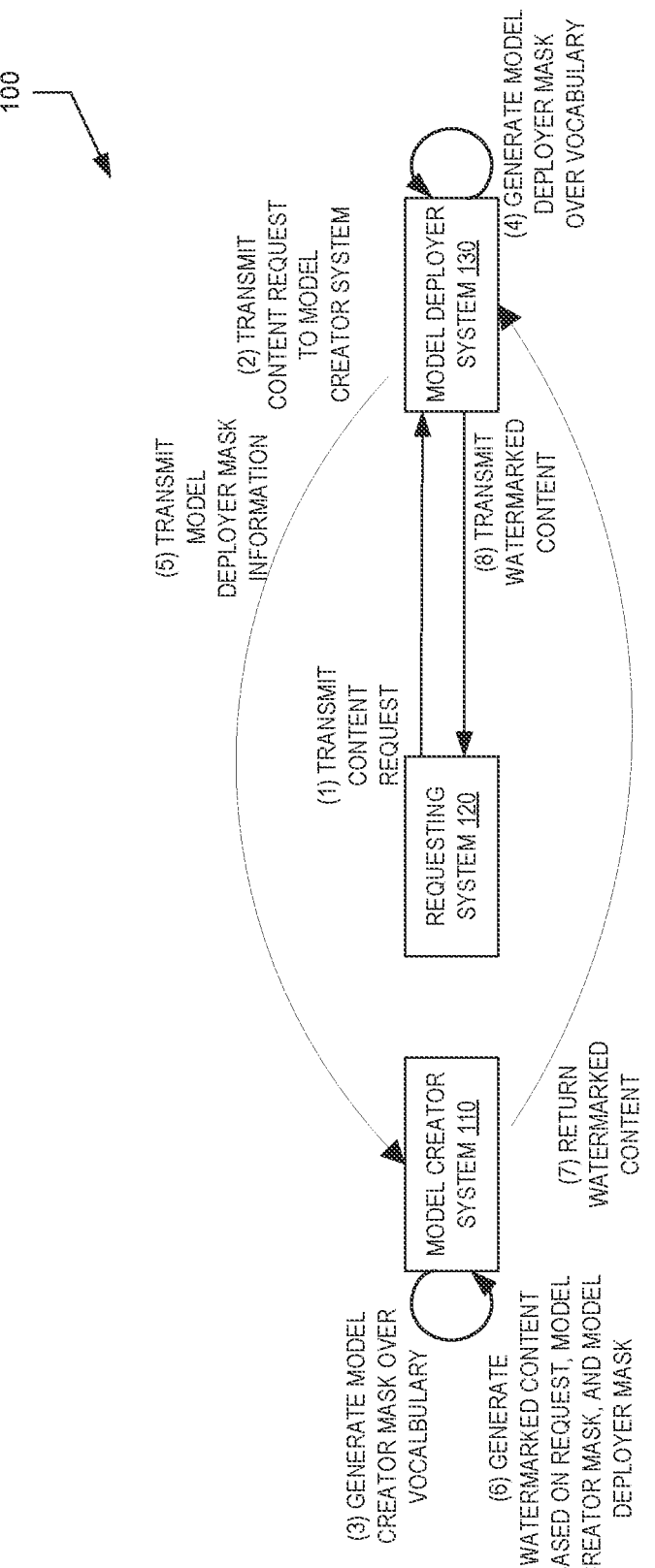
FIG. 1 is a block diagram of an illustrative process for watermarking machine generated content according to some embodiments.

The present disclosure relates to the watermarking of machine generated content. The watermarking may be performed by a model creator system providing a machine learning model to generate requested content. The machine learning model may be fine-tuned or otherwise modified by a model modifier and/or model deployer. The fine-tuned or modified machine learning model may generate a unique watermark useful for distinguishing content generated by the modified machine learning model of the model modifier from other modified versions of the machine learning model and the model creator's version of the machine learning model. The watermark may be detected by a statistical analysis of the output of the machine learning model.

Some conventional systems allow for watermarking machine generated content during or after generation of the content by a machine learning model. Some conventional systems may embed a unique identifier, for example an image, word or phrase, in the content generated by the machine learning model. Some conventional systems may watermark generated content during the content generation process. For example, by biasing or altering the output of the machine learning model used to generate the machine generated content, such that the source of the machine generated content may be uniquely identified. Such systems may determine the bias to be applied to the machine generated content as it is generated uniquely to the machine learning model using a private key value stored by the model creator.

In some conventional systems, machine learning models may be fine-tuned or otherwise modified by one or more model modifiers and/or deployers. Modified machine learning models may be configured to provide content with different limitations or parameters, or to different audiences, than the model creator version of the machine learning model. However, the watermarking process is still performed by the model creator. A watermark applied by the model creator may then fail to indicate that the output was generated by a modified model, as a single key is maintained by the model creator system for the original machine learning model and any modified version. A user receiving the machine generated content may then be unable to determine what version of the machine learning model generated the content. Where content does not conform to limitations expected for output generated by a model deployer's version of a machine learning model, such an inability to determine, using the watermark, a version of the machine learning model which was used to generate the content may lead the model deployer being blamed for generating inappropriate content based on user expectations.

To address such limitations, conventional systems may store a plurality of private key values, with at least one private key value stored for every model creator, model modifier, model deployer, and/or every version of machine leaning model. As may be recognized by one of skill in the art, such a solution presents various challenges. The model creator/modifier system, as the system generating the machine generated content, must securely maintain each private key, requiring significantly more secure storage and presenting an additional security burden on the model creator system. Further, the model creator system must correctly associate each private key with its associated modified machine learning model, and be able to provide association information such that the watermark for the modified machine learning model can be identified later by a third party. Additionally, a significant level of trust is required in such a system between the model creator and model deployer. The model deployer may not have access to the private key value used to watermark content associated with the model deployer. Further, the model deployer must trust that the model creator is able to securely store its private key and that the model creator will not use the private key for content generated by another machine learning model.

Additionally, while only one model deployer has been discussed herein, any number of model deployers may alter a machine learning model maintained by the model creator, forming a hierarchy or chain of model deployers. It should also be understood that a model deployer may also be a model modifier. Further, one or more model deployers may offer a machine learning model to one or more model modifiers, resulting in additional hierarchies. In such a situation, the model creator may be required to maintain a private key for each model deployer in the hierarchy of model deployers, and each model deployer may be required to trust one or more of the model deployers and/or model modifiers above it in the hierarchy to securely store the private key and appropriately use the key value only for their machine learning model version. Further, one or more model deployers and/or model modifiers may calculate a mask over a vocabulary differently from the description herein. It should be understood that a mask over the vocabulary generated according to any method may be combined to form a combined mask over the vocabulary as described in the present disclosure.

Some aspects of the present disclosure address some or all of the issues noted above, among others, by providing for the compositional watermarking of machine generated content using at least two masks applied over a vocabulary available to a machine learning model generating content. The present disclosure enables compositional watermarking by allowing the model creator system to maintain a private key value associated with the model creator system and/or an original version of a machine learning model maintained by the model creator system. A model deployer, as used herein, may be a system which has in some way modified the machine learning model of the model creator system. As described previously herein, a model deployer may also be a model modifier, for example the model deployer may modify a machine learning model by performing prompt engineering to adjust the input of a model user before the input is provided to the machine learning model. Prompt engineering may result in output of the machine learning model different from what would be achieved by providing the input directly to the machine learning model for content generation. The model deployer then maintains its own private key value associated with the model deployer system and/or the modified version of the machine learning model. When a request to generate content is received by the model deployer system, the model deployer system transmits a prompt based at least in part on the request to the model creator system so that the modified machine learning model may be used to generate content responsive to the request.

The model creator system, having received the prompt, provides the prompt as input to a machine learning model, for example a large language model (LLM). A model creator as used herein may include an original model creator (e.g., a system which developed and/or originally trained a machine learning model), and one or more model modifiers and/or model deployers. The model creator system then begins the process of generating a mask to be applied to the vocabulary available to the LLM to generate output, where the mask biases words or tokens of the vocabulary such that a first portion of the vocabulary is more likely to be used in generating the content responsive to the request, and a second portion of the vocabulary is less likely to be used in generating the content responsive to the request. As an illustrative example, the first portion may be referred to as a "green list" and the second portion may be referred to as a "red list." It should be recognized that while a first portion and a second portion are referred to here, the number of lists is exemplary only and any number of lists and associated portions of the vocabulary may be used.

When the prompt is provided to the LLM, the LLM then tokenizes the prompt, generating a plurality of tokens representing portions of the prompt, where the tokens are used by the LLM in the content generation process. The tokens may be stored in the form of a token vector, and the position of a token in the vector may represent the position of the information in the prompt from which the token was generated. The model creator system may then use the model creator system private key, and at least one token of the token vector, to generate a random value, for example by applying the token vector and private key as input to a pseudo-random function. The model creator system may additionally store or receive a value indicating what portion of the vocabulary is to be biased by a mask (e.g., a size of the red list and the green list), and such a value may be referred to as a list fraction. For this example, the red list and the green list will be assumed to be of a same size, but it should be recognized that the lists may differ in size. Further, the model creator system may receive or store a value indicating a size or weight of the bias value applied to words included in each list. For example, the bias value may be a normalized value between 1 and 0, where words on a list are multiplied by the bias value to increase or decrease the word's likelihood of appearing in the output of the machine learning model. The bias value may be the same or different for each list. Further, the bias value may be an absolute value having no sign, and a sign may be applied to the value (e.g., a positive sign increasing likelihood of a word appearing and a negative sign decreasing the likelihood of a word appearing) based on the type of the list.

The model creator system may then generate a mask over the entire vocabulary based on the random value, the vocabulary available to the LLM, the list fraction value, and the bias value. Notably, the model creator mask over the vocabulary may be generated such that the private key value is not practically recoverable from the mask. Advantageously, this allows for the mask to be shared between different systems while maintaining the security of the private key value, such that a watermark generated based on the mask is unique to the model creator system.

Additionally, the model creator system may transmit the token vector to the model deployer system. The model deployer system may then use a private key value securely stored by the model deployer system, and at least one token of the token vector to generate a random value, for example using a pseudo-random function. The pseudo-random function may be the same pseudo-random function used by the model creator, or may be a different pseudo-random function. The model deployer may then generate its own mask over the vocabulary available to the LLM based on the random value, the vocabulary, the list fraction, and the bias value. It should be noted that the model deployer may have its own list fraction value, and/or its own bias value. The model deployer system may use the same list fraction value and/or the same bias value as the model creator system. As noted previously herein, the mask generated according to the present disclosure may make it impractical to derive the private key value used to generate the mask, thereby allowing secure identification of the model deployer system based on the model deployer system mask. The ability to share the mask without disclosing the secure private key value allows the model deployer system to transmit the mask to the model creator system at this point, without the need for a high level of trust in the communication method (e.g., allowing for transmission over a public network), or a high level of trust in the model creator system to secure a private value of the model deployer system.

When the model creator system receives the model deployer mask, the model creator system then combines the model creator mask and the model deployer mask to create a combined mask over the vocabulary of the LLM. For example, the model creator system may add the values for each word in the vocabulary of the model deployer mask to the model creator mask. Alternatively, the model deployer system may receive the model creator mask, and generate the combined mask, and the private key of the model creator system is secured as the value is not practically recoverable from the model creator mask. The combined mask is then provided to the LLM so that content generation may proceed. The combined mask biases the selection of a next token for the token vector by the LLM, where bias values associated with words in the vocabulary by the mask affect the selection of the next token. The newly selected token is then added to the end of the token vector by the LLM as part of the response generation process to generate an updated token vector which now may include at least a portion of the response to the request. Each system—the model creator system and the at least one model deployer system—then receive the updated token vector and generate updated masks using the updated token vector as input to the pseudo-random function. This repeats until the LLM has completed generating the response, which may be indicated by the final token of the token vector indicating an end of the response. In some embodiments, a mask generated by the model creator and/or a mask generated by the model deployer may be reused in the generation of two or more tokens.

The response generated by the LLM is then compositionally watermarked based on the masks generated by the model creator system and the model deployer system. The watermark may then be detected by a party to confirm the origin of the generated content. For example, the detecting party may begin by assuming the hypothesis that the content was generated without a mask. Because the lists of the mask are generated randomly, it may be assumed that without a mask, the bias applied by the watermark would be violated based on the size of the vocabulary lists. A z-statistic may then be calculated, where z being above a threshold value indicates the watermark is present. To calculate the z value, the detecting party only needs to know the size of the vocabulary lists, the total number of tokens generated by the LLM, and the fraction of the vocabulary which is included in the green list.

As used herein, "content" should be understood to include unstructured or structured text, software code, compiled software programs, video, audio, an image, a presentation slide, a presentation (e.g., a presentation comprising a plurality of multimedia slides and transition information between the slides), a spreadsheet, a database, data formatted according to a defined structure, an email, a location indicator pointing to a location where content is stored, or any other information type. Specific types of content may be used to aid in the descriptions of various aspects of the embodiments described herein, but such use of specific content types should be understood to be for the purpose of simplifying descriptions only and not to limit the description to the content type used.

The term "model," as used in the present disclosure, can include any computer-based models of any type and of any level of complexity, such as any type of sequential, functional, or concurrent model. Models can further include various types of computational models, such as, for example, recursion models, graph network models, neural network models ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like.

An LLM is any type of language model that has been trained on a larger data set and has a larger number of training parameters compared to a regular language model. An LLM may understand more intricate patterns and generate text that is more contextually relevant to a received prompt due to its extensive training. An LLM may comprise a NN trained using self-supervised learning. An LLM may be of any type, for example a multimodal LLM. An LLM (and/or other models of the present disclosure), may include, for example, attention-based and/or transformer architecture or functionality.

The term "token," as used herein, can refer to the basic units of a modality (e.g., portions of text) processed by, and generated by, a machine learning mode, such as an LLM, during the content generation process. For example, where the content is text, a token may be an individual character, word, phoneme, portion of a word (e.g., a suffix, or a prefix), or phrase. Tokens may each be mapped to a unique numerical representation used by the machine learning model in the content generation process, and the mapping between the textual representation of a token and its numerical representation may be referred to as a vocabulary. The vocabulary may represent all tokens which may be processed as input and/or generated as part of the output of a machine learning model. For example, in a machine learning model configured to generate sound content, a vocabulary may be tokens representing all tones, pitches, volumes, or other acoustic characteristics, alone or in combination, available to the machine learning model. In another example, where the machine learning model is configured to generate image and/or video content a vocabulary may be a set of tokens representing image-based and/or text-based concepts, and/or a set of tokens representing portions of a whole image, which may have been determined during training of the machine learning model. In some embodiments, tokens in a machine learning model configured to generate images or video may be compact representations of high-level semantic concepts associated with a portion of an image. In further embodiments, tokens in a machine learning model configured to generate images or video may be possible values of a pixel (e.g., hue, tint, brightness, etc.). The process of generating tokens by a machine learning model from a received request may be referred to as tokenization. Tokenization may be performed by the machine learning model used to generate content responsive to a request, and can involve segmenting the request into tokens which are mapped by the vocabulary to each token's unique numerical representation.

Various aspects of the disclosure will be described with regard to certain examples and embodiments, which are intended to illustrate but not limit the disclosure. Although aspects of some embodiments described in the disclosure will focus, for the purpose of illustration, on particular examples of machine learning models, content types, and the like, the examples are illustrative only and are not intended to be limiting. In some embodiments, the techniques described herein may be applied to additional or alternative types of machine learning models, content types, and the like. Additionally, any feature used in any embodiment described herein may be used in any combination with any other feature or in any other embodiment, without limitation.

Example Compositional Watermarking Process

With reference to an illustrative example, FIG. 1 shows a process 100 for generating content having a compositional watermark. The process 100 beings at (1) where a requesting system 120 transmits a request for content to a model deployer system 130. The request for content may include, but is not limited to, a prompt including natural language describing a type of content to be returned by the model deployer system 130.

At (2), the model deployer system 130 transmits the content request to the model creator system 110. In some embodiments, the model deployer system 130 may alter the request received from the requesting system 120 before transmitting the altered request to a model creator system 110. For example, the model deployer system 130 may include additional information useful for returning a specific type of content to the requesting system 120 in response to the request. Further, the model deployer system 130 may tokenize the request and/or the prompt, and provide tokenized information to the model creator system 110. Tokens, as described previously herein, are representative portions of textual information (e.g., natural language, software code, and the like), which form the basic units a large language model processes to generate output. For example, a token generated by tokenizing the request may be a character, phoneme, portion of a word, word, or phrase. Tokens are mapped by a vocabulary of a machine learning model to unique numerical representations which may be useful for efficiently processing and generating information. Alternatively, the model creator system 110 may tokenize the information received from the model deployer system 130. Tokenized information may be represented as a vector of tokens, wherein the position of a token in the vector represents the position of the text information associated with the token in the textual information from which the token vector was generated.

At (3), the model creator system 110 generates a creator mask over the vocabulary available to a machine learning model of the model creator system 110. The creator mask may assign words of the vocabulary to a list. For example, there may be a green list and a red list where words in each list are biased to be more or less likely to appear in a response generated by the model creator system 110. The green list may be words in the vocabulary which are more likely to be used in a response generated by the model creator system 110. The red list may be words in the vocabulary which are less likely to be used in a response generated by the model creator system 110. A value, referred to as delta herein, may be the bias value, and may be applied to each word in the vocabulary based on whether the word appears in the red list of the green list. In some embodiments, there may be two or more bias values. For example, a first bias value may be applied to words in the green list, and a second bias value may be applied to word in the red list.

Additionally, the creator mask may be generated based on a vocabulary fraction value. The vocabulary fraction value may indicate a size of the portion of the vocabulary to be assigned to a list of the creator mask (e.g., the red list and the green list described previously herein). In some embodiments, there may be two or more vocabulary fraction values indicating different sizes of different portions of the vocabulary to be assigned to a list. The red list and the green list may include an equal portion of words in the vocabulary (e.g., 30% of words in the green list, 30% of words in the red list, and 40% of words not appearing in a list). It should be appreciated what while only a red list and a green list are referred to herein, there may be additional lists. Additional lists may have different bias values applied, and/or no bias value applied. Further, additional lists may have different proportions of words of the vocabulary assigned (e.g., a yellow list with 10% of words in the vocabulary, a green list with 30% of words in the vocabulary, a red list with 30% of words in the vocabulary, and the remaining 30% of words assigned to no list).

The creator mask may be generated based in part on a value generated using a pseudo-random function (PRF). The PRF may use a model creator key value and at least one token of the token vector generated based on the request to generate a pseudo-random value. The model creator key may be a randomly generated value securely stored by the model creator system 110, and kept secret from the model deployer system 130 and the requesting system 120. The PRF may use any number of tokens from the token vector to generate the value. When only a single token is used in the PRF, it may be possible for an attacker to craft input prompts which may bias the PRF to cause the model creator system 110 to generate an output which does not appear to be watermarked, or which appears to have a different watermark. Such an attack, which may be referred to as an enumeration attack, may be performed by querying a machine learning model of the model creator system 110 for every possible word in the machine learning model's vocabulary. When every word in the vocabulary has been queried, the attacker may be able to map the PRF based on the enumerated list. The attacker may not be able to decode the key value, but may still be able to use the enumerated list to bias the response generated by the model creator system 110. As will be recognized by one skilled in the art, the greater the number of tokens used by the PRF, the more challenging it would be for a potential attacker to perform an enumeration attack.

At (4), the model deployer system 130 generates a deployer mask over the vocabulary available to the machine learning model of the model creator system 110. The model deployer system 130 may store the vocabulary of the machine learning model to generate the deployer mask. Alternatively, the model creator system 110 may transmit the vocabulary to the model deployer system 130 in response to receiving a prompt or request. The model deployer system 130 may generate the mask using a PRF, where the input to the PRF is at least one token of the request, and a model deployer key value stored in a secure storage location of the model deployer system 130 and kept private from the model creator system 110 and the requesting system 120. As described in relation to the creator mask, the deployer mask may have a bias value, which may be the same bias value as used for the creator mask. Additionally, as described in relation to the creator mask, the deployer mask may have a vocabulary fraction value indicating a size of a portion of the vocabulary to be assigned to a list. The vocabulary fraction value may be the same for the deployer mask as the vocabulary fraction value used for the creator mask. In some embodiments, the deployer mask may be applied to only a portion of the vocabulary not included in the creator mask. For example, the vocabulary fractions value may be 20%, where 20% of words are in the creator mask's green list, and 20% of words are in the creator mask's red list. The deployer mask may then only select words for the deployer green list and the deployer red list from the 60% of the vocabulary not already contained in a list of the creator mask.

At (5), the model deployer system 130 transmits the deployer mask information to the model creator system 110. It should be understood that while the above description refers to the model creator system 110 generating a model creator mask before the model deployer system 130 has generated a model deployer mask, the model creator mask and the model deployer mask may be generated in any order, or substantially simultaneously. Further, the vocabulary and/or the token vector may be transmitted from the model creator system 110 to the model deployer system 130 at any point in the process of generating the model creator mask. For example, the model creator system may provide the vocabulary and/or the token vector before, during, or after the creation of the model creator mask.

At (6), the model creator system 110 generates watermarked content based on the model creator mask and the model deployer mask. The model creator system 110 may combine the creator mask and the deployer mask to generate a combined mask. For example, by adding the tokens of the green list of the creator mask to the tokens of the green list of the deployer mask to create a combined green list, and adding tokens of the red list of the creator mask to the tokens of the red list of the deployer mask to create a combined red list. The model creator system 110 may then select a token for the response based on applying the combined mask to the vocabulary, such that in the example of a green list and a red list, a token from the combined green list is more likely to appear than a token from the combined red list. The likelihood of a token from the green list appearing more than a token from the red list will be based on the bias value applied to tokens of each list.

In some embodiments, when generating content, after selecting each token to append to the generated content, the model creator system 110 may request from the model deployer system 130 an updated deployer mask. Additionally, the model creator system 110 may transmit to the model deployer system 130 an updated token vector which includes the newly appended token of the generated content to the token vector. The model deployer system 130 may then use the updated token vector in the same manner as the original token vector to generate an updated deployer mask. Further, the model creator system 110 may update the creator mask after appending each new token to the generated content using the updated token vector in place of the original token vector. This process may repeat until the machine learning model of the model creator system 110 has completed the content generation process and has produced a final watermarked generated content.

At (7) the model creator system 110 transmits the watermarked generated content to the model deployer system 130 and at (8) the model deployer system 130 transmits the watermarked generated content to the requesting system 120. As the requesting system 120 receives the watermarked generated content from the model deployer system 130, the requesting system 120 may not be aware of the involvement of the model creator system 110 in the content generation process.

In some embodiments, a model modifier system (e.g., model modifier system 240) may be in communication with the model creator system 110, and/or the model deployer system 130, as shown in reference to FIG. 2 described below herein. The model modifier system is configured to modify a machine learning model provided by the model deployer system 130. The model modifier system may provide additional modifications to a machine learning model of the model creator system 110. For example, the model modifier system may provide data useful for domain-specific training of a content generation model to the model deployer system 130. The model deployer system 130 may then train the model of the model creator system 110 on the domain-specific training data of the model modifier system and make the trained model available to the model modifier system. Further, a chain or hierarchy of any number of model deployer systems and model modifier systems may exist, where each model deployer and/or model modifier may provide a mask for use in watermarking generated content.

Example Compositional Watermarking Environment

Figure 2:
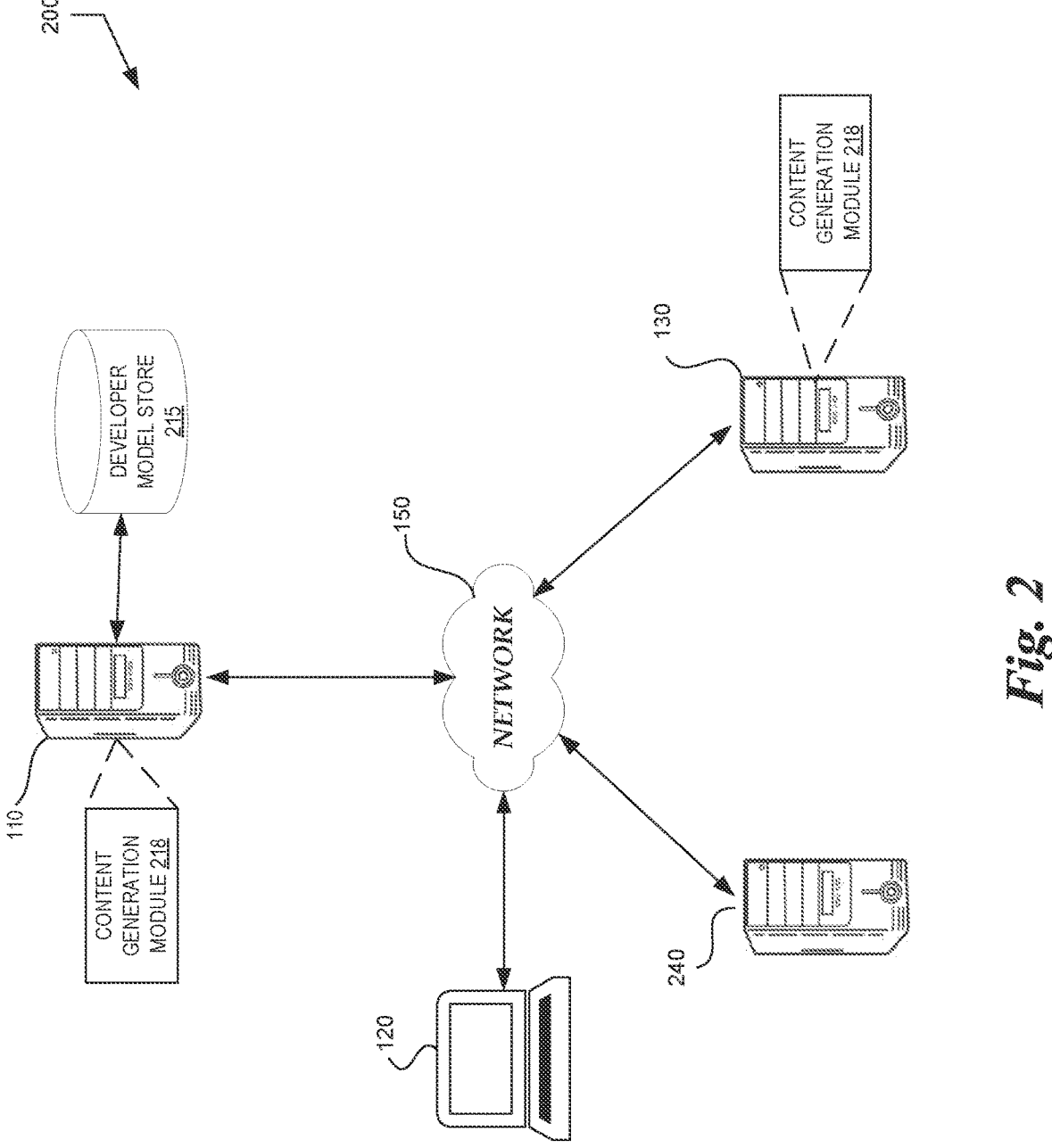
FIG. 2 is a block diagram of illustrative data flows within system for applying compositional watermarking to machine generated content according to some embodiments.

FIG. 2 illustrates an example environment 200 in which systems operate to generate content having a compositional watermark. The environment 200 comprises a model creator system 110, a requesting system 120, a model deployer system 130, a model modifier system 240, and a network 150.

The model creator system 110 is configured to communicate with a model deployer system 130 to generate content based on a request, and comprises a content generation module 218, and a developer model store 215. The developer model store 215 stores one or more machine learning models (e.g., one or more LLMs) used to generate content. The developer model store 215 may store one or more foundation models, where foundation models are machine learning models trained by the model creator system 110 and intended for further fine-tuning or training by a model deployer system 130 and/or one or more model modifier systems 240. The developer model store 215 may also store the fine-tuned or otherwise modified versions of the foundation models generated by the model deployer system 130. Additionally, the developer model store 215 may store a private key used for generating a creator mask for a foundation model stored therein.

The content generation module 218 is configured to generate content using a machine learning model of the developer model store 215. For example, the model creator system 110 may receive a request from the model deployer system 130 to generate content. The content generation module 218 may then identify a machine learning model associated with the model deployer system 130 to be used to generate the content. Alternatively, the model deployer system 130 may indicate as part of the request to generate content information which may be used to identify the machine learning model to be used to generate the requested content. The content generation module 218 may retrieve a key associated with a foundation model from which the machine learning model to be used to generate the content was modified, a key associated with the developer model store 215, and/or a key associated with the model creator system 110. The key is then used when generating watermarked content. Content generated by the content generation module 218 is watermarked, as described in relation to FIGS. 1, and 3-4.

The requesting system 120 is a computing device, and may be associated with a user. The computing device of the requesting system 120 may be, for example, a laptop computing device, a smartphone, a mobile computing device, a display and input device in communication with a server, and the like.

The model deployer system 130 is configured to receive content requests from the requesting system 120 and provide information in the form of a request to the model creator system 110 necessary to generate watermarked generated content. In some embodiments, the model creator system 110 may additionally be used to train or fine-tune a machine learning model of the model creator system 110. The model deployer system 130 may additionally determine, based on a content request received from the requesting system 120 additional information necessary to generate the requested content using a machine learning model of the model creator system 110. In some embodiments, the model deployer system 130 may request the machine learning model from the model creator system 110, and run the machine learning model to generate watermarked content. The model deployer system 130 may comprise a content generation module 218 described previously herein. In embodiments where the content generation module 218 operates on the model deployer system 130, it should be understood that the creator mask may be generated by the model deployer system 130, and the deployer mask may be generated by the model creator system 110. Alternatively, the creator mask may be requested from the model creator system 110, including by transmitting a current token vector from the model deployer system 130 to the model creator system 110 via the network 150, and the deployer mask may be generated by the model deployer system 130.

The model modifier system 240 is configured to modify a machine learning model provided by the model deployer system 130. The model modifier system 240 may provide additional modifications to a machine learning model of the model creator system 110. For example, the model modifier system 240 may provide data useful for domain-specific training of a content generation model to the model deployer system 130. The model deployer system 130 may then train the model of the model creator system 110 on the domain-specific training data of the model modifier system 240 and make the trained model available to the model modifier system 240. Additionally, a chain or hierarchy of any number of model deployer systems and model modifier systems may exist, where each model deployer and/or model modifier may provide a mask for use in watermarking generated content.

Example Compositional Watermarking Routines

Figure 5:
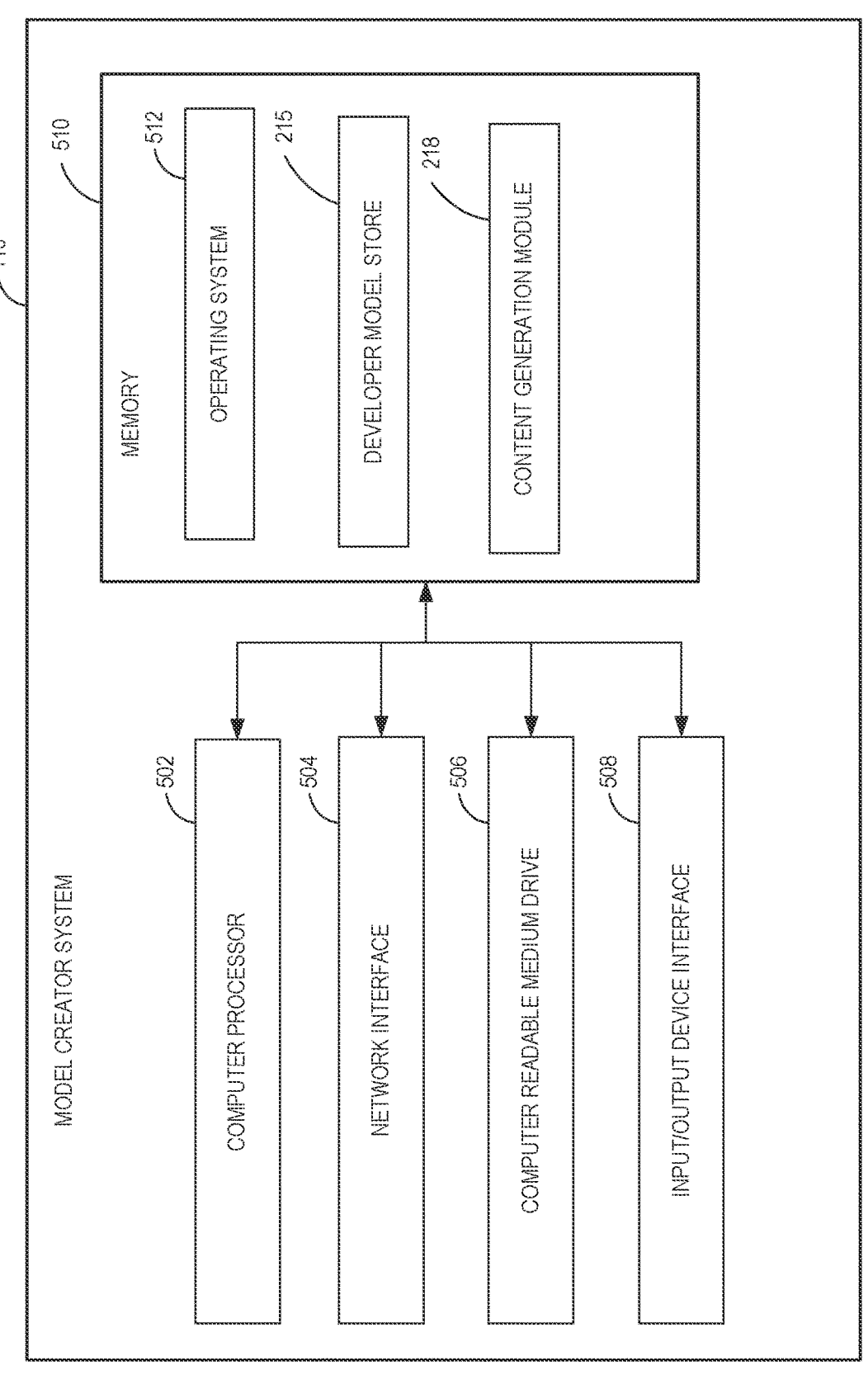
FIG. 5 is a block diagram of an illustrative computing system configured to provide compositional watermarking of machine generated content according to some embodiments.

When a routine described herein (e.g., routine 300, and 400) is initiated, a set of executable program instructions stored on one or more non-transitory computer-readable media (e.g., hard drive, flash memory, removable media, etc.) may be loaded into memory (e.g., random access memory or RAM) of a computing device, such as the model deployer system 130 shown in FIG. 5 or the model creator system 110 shown in FIG. 1, and executed by one or more processors of the respective system. In some embodiments, the routines 300, and 400, or portions thereof may be implemented on multiple processors, serially or in parallel.

Figure 3:
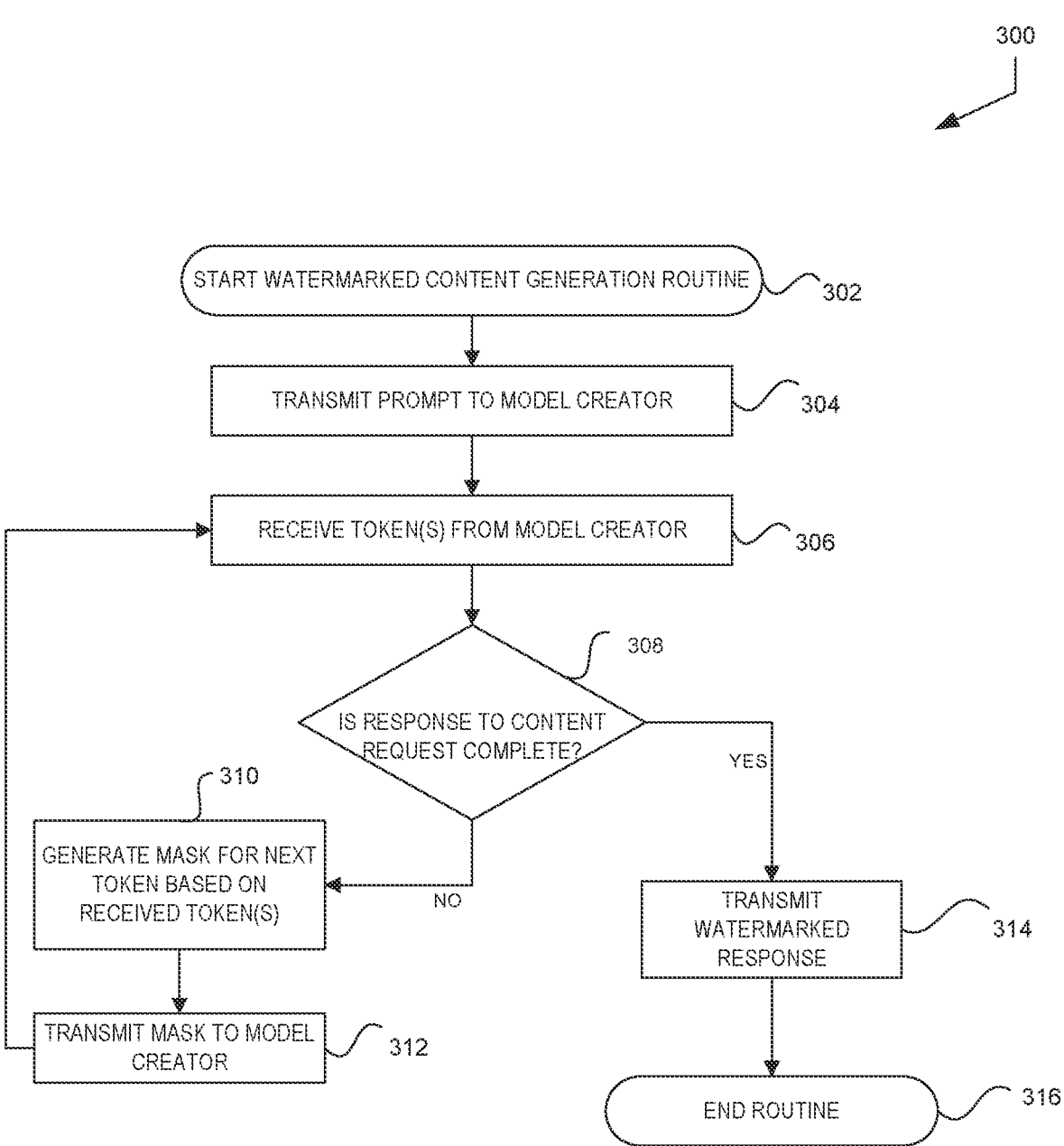
FIG. 3 is a flow diagram of an illustrative routine for generating watermarked content according to some embodiments.

FIG. 3 illustrates example routine 300 for a model deployer to generate content having a compositional watermark. The routine 300 may be executed by the model deployer system 130. The routine 300 begins at block 302, for example in response to the model deployer system 130 receiving a request for content from the requesting system 120 via the network 150.

At block 304, the model deployer system 130 transmits a prompt to the model creator system 110. The prompt may include at least a portion of the request for content received from the requesting system 120. Additionally, the prompt may include additional information generated by the model deployer system 130 based on the request for content. For example, the model deployer system 130 may include in the request an indication of a machine learning model to be used to generate the content. Further, the model deployer system 130 may include in the request additional information, which may be based in part on the request for content, useful for the generation of generated content responsive to the request for content by a machine learning model of the model deployer system 130 (e.g., an output format for the generated content, contextual information for the generated content, information related to the request for generated content, etc.).

At block 306, the model deployer system 130 receives at least one token from the model creator system 110. The at least one token may be generated based on the request for content. In some embodiments, the model deployer system 130 may receive a token vector as described previously herein. Alternatively, in embodiments where the model deployer system 130 comprises a content generation module

218 to perform content generation using a machine learning model, the content generation module 218 may generate the token or token vector.

At decision block 308, a determination is made, for example by the content generation module 218 or the model deployer system 130, as to whether the one or more tokens represent a complete response to the request for content received from the requesting system 120. When the response is complete, the routine 300 moves to block 314. When the response is determined to not be complete, the routine 300 moves to block 310. Whether the response is complete may be determined, for example, based on information received from the content generation module 218 and/or the model creator system 110. Alternatively, the determination of whether the response is complete may be determined based on the presence of a terminator token appended to the end of the token vector indicating the token vector is complete.

At block 310, the model deployer system 130 generates a mask to be applied by the content generation module 218 when determining the next token of the response. As described previously herein, the mask may be generated based on one or more of the tokens received from the model creator system 110 and/or a key value maintained privately by the model deployer system 130. The mask may indicate a bias to be applied to a portion of words of the total available vocabulary of a machine learning model used by the content generation module 218 to generate content.

At block 312, the model deployer system 130 transmits the mask generated by the model deployer system 130 to the model creator system 110. The model creator system 110 may then combine the mask generated by the model deployer system 130 with a mask generated by the model creator system 110 to create a combined mask. The combined mask may then be applied by the content generation module 218 to the selection of a next token when generating content.

At block 314, the model deployer system 130 transmits a watermarked response including watermarked machine generated content to the requesting system 120. The response may include additional information, which may be related to the machine generated content. For example, the response may include an indication of the one or more machine learning models used to generate the machine generated content, an indication of a system (e.g., the model creator system 110) used to generate the machine generated content, formatting information for the machine generated content, and the like. When the watermarked response to the request for content, containing machine generated content identifiable by a compositional watermark embedding in the machine generated content, has been transmitted, the routine 300 moves to block 316 and ends.

Figure 4:
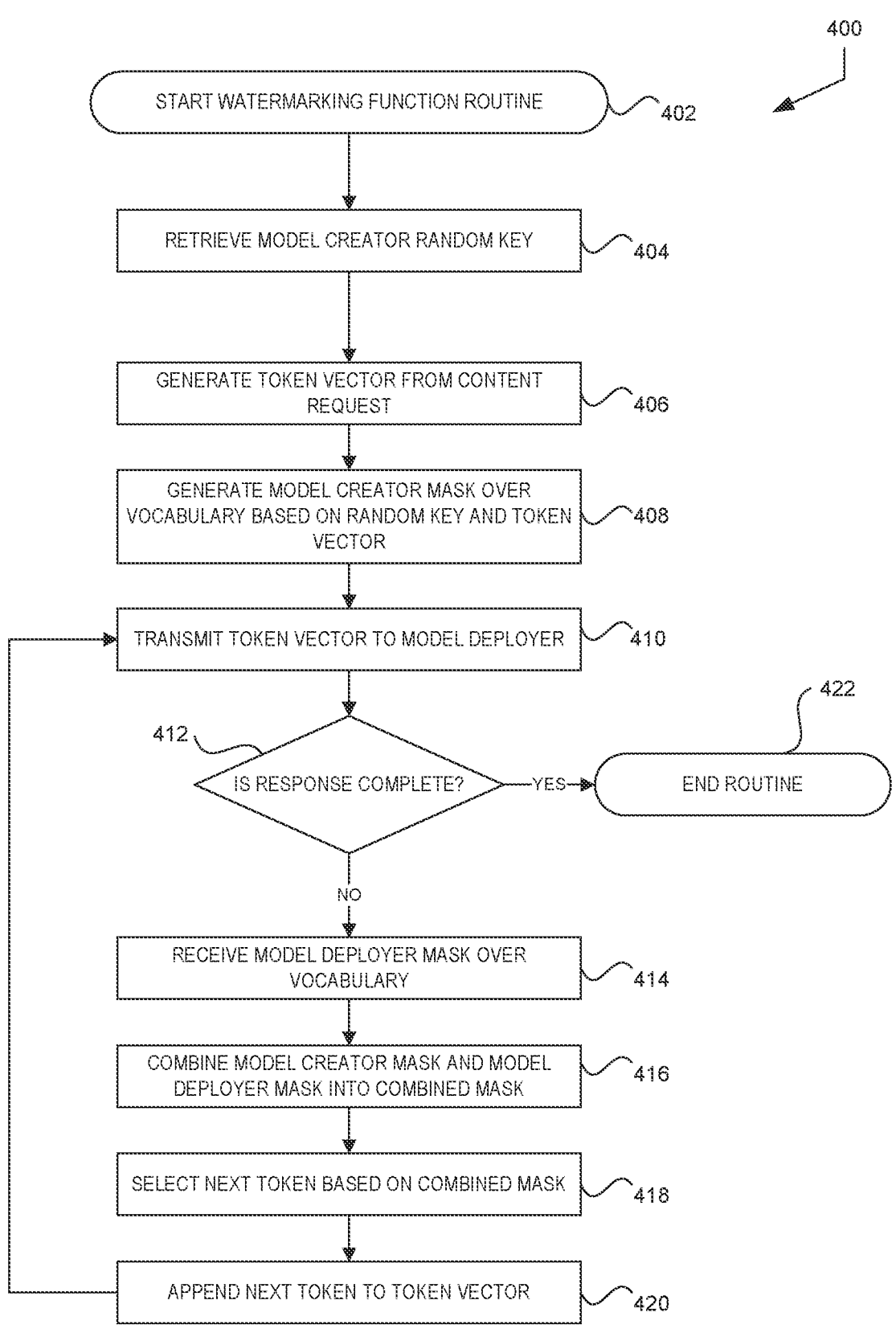
FIG. 4 is a flow diagram of an illustrative routine for generating watermarked content using a modified content generation model according to some embodiments.

FIG. 4 illustrates example routine 400 for applying compositional watermarking to the machine generation of content by a model creator. The routine 400 may be executed by the model creator system 110. The routine 400 begins at block 402, for example in response to the model creator system 110 receiving a request for content from the model deployer system 130 via the network 150.

At block 404, the model creator system 110 retrieves a private key value used to generate a vocabulary mask, for example from the developer model store 215 of the model creator system 110. In some embodiments, the model creator system 110 may generate a new private key value to be used in generating the vocabulary mask. In further embodiments, the model creator system 110 may store a private key value used in a limited set of applications, for example a private key associated with a domain of use (e.g., medical applications, gaming applications, banking applications, etc.), a specific user, a machine learning model type, etc.

At block 406, the model creator system 110 generates a token vector based on the request for content. For example, the request may be provided in textual form to a large language model. The large language model may then generate a set of tokens from the request, and provide the set of tokens as a token vector where a token's position in the token vector may indicate the position of a portion of the text from which a token was generated in the request.

At block 408, the model creator system 110, or the content generation module 218 of the model creator system 110, generates a model creator mask over the available vocabulary of the machine learning model used to generate content. The mask over the vocabulary is generated based at least in part on the private key value of the model creator system 110, and at least a portion of the token vector. In some embodiments, one token of the token vector and the private key value may be applied to the PRF to generate a value used in randomly selecting a portion of words of the vocabulary to assign a bias value to. The bias value may be normalized, such that the value is between 0 and 1. Additionally, a list fraction value or vocabulary fraction value may be used to determine the percentage, or number of words in the total available vocabulary, to be assigned to one or more lists indicating words to have an increased, decreased, or unchanged likelihood of appearing in the output of the machine learning model. The mask over vocabulary may be generated based on the output value of the PRF, the bias value, the total vocabulary available to the machine learning model, and/or the list fraction value.

At block 410, the model creator system 110 transmits the token vector to the model deployer system 130. In some embodiments, such as where the content generation module 218 operates on the model deployer system 130, the model creator system 110 may transmit the model creator mask to the model deployer system 130.

At decision block 412, the model creator system 110 determines whether the response, including the machine generated content based on the request, is complete. For example, the model creator system 110 may determine that a final token of the token vector is a special token indicating that a sentence or response is complete. Alternatively, the model creator system 110 may determine that the size of the token vector has reached a maximum length, and that a machine learning model of the content generation module 218 will no longer be able to process and/or add to the token vector. In another alternative, the model deployer system 130 may determine the response is complete and provide an indication to the model creator system 110 that the response is complete. When the response is complete, the routine 400 moves to block 422 and ends. When the routine 400 has ended, a user may request to determine whether a model has generated a content item. To determine whether a machine learning model that has generated content using the watermarking process described herein generated the content item, any party may: (1) assume a null hypothesis, that the generated content was generated with an unbiased vocabulary, is true; and (2) calculate a z-statistic, where z being above a threshold value indicates the machine learning model generated the watermarked content. To calculate the z value, the detecting party may need to know the size of the vocabulary list, the total number of tokens generated by the LLM, and the fraction of the vocabulary which is included in a list having a bias value. When additional information is used to generate the watermark (e.g., a plurality of lists each having a different bias value), additional information may be needed to calculate the z value. An example equation for calculating the z-statistic is Equation (1) below. In Equation (1), T is the number of tokens being considered, and $ISI_G$ is the number of tokens in the list having the bias value.

$$z = 2(|s|_G - T/2)/\sqrt{T} \qquad (1)$$

Otherwise, the model creator system 110 may transmit vocabulary to the model deployer system 130. In some embodiments, the vocabulary may be stored by the model deployer system 130, and the model creator system 110 will not transmit the vocabulary. The routine 400 then moves to block 414.

At block 414, the model creator system 110 receives the model deployer mask over the vocabulary from the model deployer system 130, for example via the network 150. The model deployer mask over the vocabulary may be generated, for example, as described previously herein with respect to FIG. 1. Additionally, it should be understood that while a single model deployer system 130 and model deployer mask are referred to herein, such reference is for the purpose of simplifying explanation, and any number of model deployers and model deployer masks may be provided to the model creator system 110 by the model deployer system 130. For example, a first model deployer may modify a machine learning model of the model creator system 110, and a second model deployer may further modify the machine learning model modified by the first model deployer. The second model deployer may then receive the request to generate content, transmit the request to the first model deployer, and the first model deployer may then transmit the request to the model creator system 110. In such a configuration, the second model deployer may then transmit a second model deployer mask to the first model deployer. The first model deployer may then transmit the second model deployer mask to the model creator system 110 along with the first model deployer mask, and/or transmit a first model deployer combined mask generated by the model deployer system 130 based on combining the first model deployer mask and the second model deployer mask. Such a chain of model deployers may be extended to any number of model deployers, and the model creator system 110 may receive as many model deployer masks as there are model deployers, and/or at least one of the model deployers may generate a combined model deployer mask and transmit the combined model deployer mask to the model creator system 110 such that the model creator system 110 receives all model deployer mask information for each model deployer.

At block 416, the model creator system 110 combines the model creator mask and the model deployer mask to create a combined mask. The combined mask may be generated as described previously with respect to FIG. 1, and indicates a bias to be applied to the words or tokens of the vocabulary available to the machine learning model used to generate the machine generated content.

At block 418, the content generation module 218 selects a next token using the machine learning model to be appended to the token vector. The next token to be appended to the token vector is selected based in part on the combined mask. The combined mask biases available words or tokens of the machine learning model's vocabulary, such that one or more tokens are more likely to appear in the machine generated content, and one or more tokens are less likely to appear in the machine generated content. The likelihood a token or word will appear or not appear in the machine generated content may be provided by a bias value associated with the token or word, as described in relation to FIG. 1 previously herein.

At block 420, the next token selected by the machine learning model is appended to the token vector, for example as a last token of the token vector, and the routine 400 returns to block 410.

Execution Environment

FIG. 5 illustrates various components of an example computing device 500 configured to implement various functionality described herein.

In some embodiments, the model creator system 110 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the model creator system 110 may be implemented as web services consumable via one or more communication networks. In further embodiments, the model creator system 110 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a model creator system 110 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces 508; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the model creator system 110. As another example, the computer readable memory 510 can store a developer model store 215. As another example, the computer-readable memory 510 can store a content generation module 218.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A system comprising:
a computer-readable memory comprising a content generation model; and
one or more processors in communication with the memory, wherein computer-executable instructions, when executed by the one or more processors, causes the one or more processors to at least:
generate a key value;
receive a content request;
generate a set of tokens based on the content request using a first machine learning model configured to tokenize input text;
transmit the set of tokens to a model deployer;
receive a first vocabulary mask from the model deployer in response to transmission of the set of tokens;
generate a second vocabulary mask based in part on a vocabulary, the key value, and the set of tokens;
combine the first vocabulary mask and second vocabulary mask to generate a combined vocabulary mask;
obtain a next token based in part on an output of a second machine learning model generated in response to the set of tokens and the combined vocabulary mask being provided as input to the second machine learning model;
add the next token to the set of tokens to generate an updated set of tokens; and
transmit the updated set of tokens to satisfy the content request.

2. The system of claim 1, wherein the computer-executable instructions, when executed, further cause the one or more processors to:
transmit a bias value to the model deployer; and
generate the first vocabulary mask based in part on the bias value.

3. The system of claim 1, wherein the computer-executable instructions, when executed, further cause the one or more processors to:
transmit a list fraction value to the model deployer; and
generate the first vocabulary mask based in part on the list fraction value.

4. The system of claim 1, wherein the first machine learning model is a first large language model, and wherein the second machine learning model is a second large language model.

5. The system of claim 1, wherein the second vocabulary mask is generated based in part on a pseudorandom value, and wherein the computer-executable instructions, when executed, further cause the one or more processors to:
generate the pseudorandom value based on a pseudorandom function that accepts, as input, the key value and the set of tokens.

6. A method comprising:
receiving a content request from a requesting system;
transmitting the content request to a model creator;
receiving a set of tokens from the model creator;
generating a vocabulary mask based in part on a key value and the set of tokens;
transmitting the vocabulary mask to the model creator;
receiving an updated set of tokens;
determining that the updated set of tokens represent a complete response; and in response to determining that the updated set of tokens represent a complete response, transmitting the updated set of tokens to the requesting system.

7. The method of claim 6, further comprising receiving a vocabulary from the model creator, and wherein the vocabulary mask is generated based in part on the vocabulary.

8. The method of claim 6 further comprising:

receiving a bias value from the model creator; and receiving a list fraction value from the model creator, wherein the vocabulary mask is generated based in part on the bias value and the list fraction value.

9. The method of claim 6, wherein the set of tokens is received from the model creator in response to transmitting the content request.

10. The method of claim 6, further comprising:

transmitting the set of tokens to a model modifier;

receiving a second vocabulary mask from the model modifier;

combining the vocabulary mask and the second vocabulary mask to generate a combined vocabulary mask; and transmitting the combined vocabulary mask to the model creator.

11. The method of claim 6, further comprising:

transmitting the set of tokens to a model modifier;

in response to transmitting the set of tokens, receiving a second vocabulary mask from the model modifier; and transmitting the second vocabulary mask to the model creator.

12. The method of claim 6, further comprising:

in response to determining the updated set of tokens do not represent a complete response, generating a second vocabulary mask based in part on the key value and the updated set of tokens;

transmitting the second vocabulary mask to the model creator;

receiving a second updated set of tokens;

determining the second updated set of tokens represents a complete response;

formatting a response based in part on the second updated set of tokens; and transmitting the response to the requesting system.

13. The method of claim 6, further comprising:

transmitting a key request to a secure storage location under control of a model deployer; and receiving the key value from the secure storage location in response to the key request.

14. The method of claim 6, wherein generating the vocabulary mask comprises:

generating a first list comprising a first plurality of tokens of a vocabulary, wherein the vocabulary is used by a machine learning model of the model creator to generate content responsive to the content request; wherein each token of the first list is associated with a first bias value, and wherein the first bias value indicates an increase in a likelihood a token of the first list will be selected as the next token by a machine learning model; and generating a second list comprising a second plurality of tokens of the vocabulary, wherein the second plurality of tokens is different from the first plurality of tokens, wherein each token of the second list is associated with a second bias value, and wherein the second bias value indicates a decrease in the likelihood a token of the second list will be selected as the next token by the machine learning model.

15. A non-transitory machine-readable storage medium encoded with instructions executable by a processor of a computing device, wherein the instructions, when executed by the processor, cause the computing device to at least:

receive a content request;

transmit the content request to a model creator;

receive a set of tokens from the model creator;

receive a model creator vocabulary mask from the model creator;

generate a vocabulary mask based in part on a key value and the set of tokens;

generate a combined vocabulary mask based in part on the vocabulary mask and the model creator vocabulary mask;

transmit the combined vocabulary mask to the model creator;

receive an updated set of tokens;

determine that the updated set of tokens represent a complete response; and transmit the updated set of tokens to satisfy the content request.

16. The non-transitory machine-readable storage medium of claim 15, wherein the instructions, when executed, further cause the computing device to:

receive a first size from the model creator;

receive a second size from the model creator;

receive a first bias value from the model creator;

receive a second bias value from the model creator;

generate a first list of the first size comprising a first plurality of tokens of a vocabulary, wherein each token of the first list is associated with the first bias value, and wherein the first bias value indicates an increase in a likelihood a token of the first list will be selected as a next token by a machine learning model of the model creator used to generate content responsive to the content request; and generate a second list of the second size comprising a second plurality of tokens of the vocabulary, wherein the second plurality of tokens is different from the first plurality of tokens, wherein each token of the second list is associated with the second bias value, and wherein the second bias value indicates a decrease in the likelihood a token of the second list will be selected as the next token by the machine learning model, and wherein the vocabulary mask is generated based in part on the first list and the second list.

17. The non-transitory machine-readable storage medium of claim 16, wherein the first size is equal to the second size, and wherein the first bias value is equal to the second bias value.

18. The non-transitory machine-readable storage medium of claim 16, wherein the model creator vocabulary mask comprises a model creator first list of the first size, and a model creator second list of the second size.

19. The non-transitory machine-readable storage medium of claim 15, wherein the content request is received from a requesting system, and wherein the requesting system is at least one of: a model modifier, or a model deployer.

20. The non-transitory machine-readable storage medium of claim 15, wherein the set of tokens are generated by a machine learning model of the model creator, and wherein the machine learning model is a large language model.

\* \* \* \* \*